(No Model.)

A. RECKENZAUN.
SECONDARY BATTERY.

No. 385,200. Patented June 26, 1888.

Attest:
Henry Drury.

Inventor:
Anthony Reckenzaun.

UNITED STATES PATENT OFFICE.

ANTHONY RECKENZAUN, OF LONDON, ENGLAND, ASSIGNOR TO THE ELECTRIC CAR COMPANY OF AMERICA, OF PHILADELPHIA, PENNSYLVANIA.

SECONDARY BATTERY.

SPECIFICATION forming part of Letters Patent No. 385,200, dated June 26, 1888.

Application filed March 22, 1888. Serial No. 268,186. (No model.)

*To all whom it may concern:*

Be it known that I, ANTHONY RECKENZAUN, of London, England, have invented an Improvement in Secondary Batteries, of which the following is a specification.

My invention has reference to secondary batteries; and it consists of certain improvements, all of which are fully set forth in the following specification and shown in the accompanying drawings, which form part thereof.

My invention has particular reference to the electrodes for secondary batteries in which previously-formed cylinders or pieces of hardened oxide of lead or equivalent active material are secured in the same plane by having a binding or holding and conducting plate of lead cast around them—such, for instance, as is set out in Letters Patent No. 371,352, October 11, 1887, granted to me. In said Letters Patent the surface of the electrode is shown as perfectly smooth—that is to say, the exposed surface of the active material is on the same level as the face of the cast lead plate. This is objectionable, as much surface and body of active material is lost, and to make the surface flat is expensive and a slow operation; and it is the object of this invention to overcome such defect.

In making my electrode I form the cylinders or pieces of active material of a tightly-compacted mass, formed, preferably, under considerable pressure while moist, so as to present when dry a smooth hard surface not possible to readily crumble or crack when subjected to the action of heat in the process of making the electrode. The electrode is formed by arranging these compacted cylinders or pieces in a mold having grooves, as set out in another application of mine, Serial No. 268,187, and bearing even date with this, and whereby a certain portion of the surface is protected against the molten lead entering the mold. The lead is then cast around the cylinders of active material, and when removed from the mold the faces of active material so protected will extend beyond the face of the holding-plate of lead, forming an irregular surface.

Figure 3:
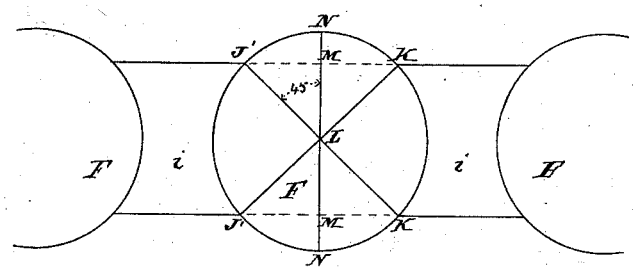
Figure 1:
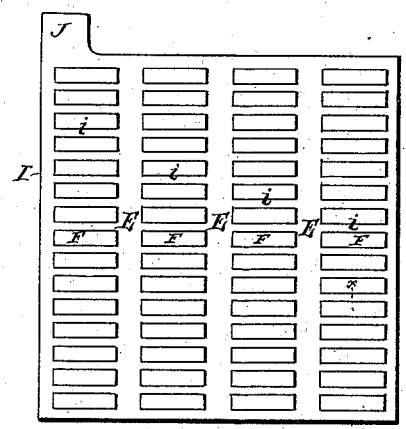
Figure 2:
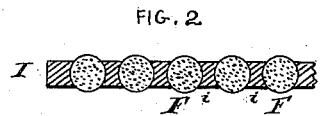
Figure 4:

In the drawings, Figure 1 is a side elevation of an electrode embodying my invention. Fig. 2 is a cross-section of a portion of same on line $x x$ of Fig. 1. Fig. 3 is a diagram showing the advantage of having the outer surface of active-material cylinders or pieces curved or extended beyond the surface of the lead plate, and Fig. 4 is a perspective view of one form of cylinder of active material.

The electrode is shown as formed of a lead plate having vertical and transverse bars, between which are arranged the cylinders or pieces of active material and around which the lead is cast.

I is the lead plate, having the arm J for making connection.

E are the vertical bars or ribs, and $i$ are the horizontal or transverse bars or ribs.

F are the cylinders or pieces of active material. The edges of the parts $i$ extend partly over the active material and hold it in position, as is clearly shown in Figs. 2 and 3, from which it is seen that the plate I is not as thick as the cylinders or pieces of active material.

Referring to Fig. 3, we see the relation between the surface of the active material when curved and extended beyond the lead-plate surface, and also when it is only on a level with such surface. The proportion is easily calculated as follows: J' L equals R, the radius of the cylinders. J' M K equals the length of surface when on a level with the plate, and J' N K equals the arc representing the length of the surface in my preferred form. We have, then, considering the angle J' L N = N L K = 45 degrees: J' M = R, sine 45 degrees, and J' M K = 2 R, sine 45 degrees. $J' N K = \dfrac{2 R \pi}{4} =$ 1.5708 R. Sine 45 degrees $= \dfrac{R}{\sqrt{2}}$. Then J' M K $= \dfrac{2 R}{\sqrt{2}} = 1.415$ R; hence J' M K : J' N K : : 1.415 R : 1.5708 R, or, approximately, as 1.4 is to 1.6, which proportion carried out in the large number of sections is very appreciable. Thus, if the sections or cylinders are two inches long each, and there are one hundred in each plate, we would have fifty square inches of surface, (on both sides,) considering J' M K equals one-eighth of an inch in the construction with the surface J' M K employed, and about 50 square inches with the construction employing J' N K as the surface, which is again of more than one-eighth in the surface presented without increasing the size of the electrode or its cost.

By casting against metal surfaces the lead bars E and *i* are very smooth, and their hold upon the active material is clean and electrical contact good. It will be observed that there are a series of rows of these cylinders or pieces of active material divided by the vertical bars or ribs E, and each row is formed of a series of parallel cylinders or pieces separated from each other by the bars E, of lead. This gives the greatest area of active surface with the necessary strength.

It is evident that it is not at all essential that the bars E and *i* should run at right angles to each other nor to the edges of the electrode, though they are preferably so made. The outer surfaces of the electrodes so formed are ribbed or formed with raised projections of active material, presenting an extended area of operative surfaces.

Having now described my invention, what I claim as new, and desire to secure by Letters Patent, is—

1. An electrode for secondary batteries, consisting of a retaining-plate having a series of double-concave grooves parallel to each other and containing therein cylindrical pieces of active material exposed equally on both sides of the plate, the exposed portions being the outwardly curved or raised lateral surfaces of the cylindrical pieces of active material, which project beyond the surface of the retaining-plate.

2. An electrode for a secondary battery, consisting of a retaining-plate having a series of parallel openings through the same and a series of parallel previously-formed cylinders of compacted active material arranged in said openings and extending out from both surfaces to form ribs or raised portions of active material extending beyond the surface of the retaining-plate.

3. An electrode for a secondary battery, consisting of a series of cylindrical pieces of active material formed of a firmly-compacted mass under pressure, arranged parallel and close to each other without touching, a retaining-plate of metal cast about said active-material cylindrical pieces and shrunk thereon to form a positive contact and a firm electrode, and in which the cylinders extend out upon each side of the retaining-plate, forming parallel ribs.

4. A cylinder or section of active material for an electrode, consisting of an elongated mass of oxide of lead or equivalent active material compacted into a solid smooth-surfaced cylinder or section by pressure.

In testimony of which invention I hereunto set my hand.

ANTHONY RECKENZAUN.

Witnesses:
E. M. BRECKINREED,
ERNEST HOWARD HUNTER.